United States Patent [19]

Guest

[11] Patent Number: 5,370,423
[45] Date of Patent: Dec. 6, 1994

[54] TUBE COUPLINGS

[76] Inventor: John D. Guest, "Iona", Cannon Hill Way, Bray, Maidenhead, Berks, United Kingdom

[21] Appl. No.: 23,198

[22] Filed: Feb. 25, 1993

[30] Foreign Application Priority Data

Feb. 28, 1992 [GB] United Kingdom ............... 9204375

[51] Int. Cl.⁵ .......................................... F16L 37/092
[52] U.S. Cl. ................................ 285/39; 285/322; 285/308
[58] Field of Search ............... 285/39, 322, 323, 324, 285/243

[56] References Cited

U.S. PATENT DOCUMENTS

| | | | |
|---|---|---|---|
| 3,653,689 | 4/1972 | Sapy et al. | 285/322 |
| 4,304,426 | 12/1981 | Francis | 285/323 |
| 4,573,716 | 3/1986 | Guest | 285/323 |
| 4,653,781 | 3/1987 | Sheets et al. | 285/323 |
| 4,915,421 | 4/1990 | Dennany, Jr. | 285/39 |
| 4,923,220 | 5/1990 | Guest et al. | 285/323 |
| 5,042,848 | 8/1991 | Shiozaki | 285/323 |

FOREIGN PATENT DOCUMENTS

| | | | |
|---|---|---|---|
| 0255368B1 | 4/1990 | European Pat. Off. | |
| 364917 | 4/1990 | European Pat. Off. | 285/322 |
| 445282 | 6/1927 | Germany | 285/322 |
| 840035 | 5/1952 | Germany | 285/323 |
| 2413750 | 11/1974 | Germany | 285/323 |
| 4002057 | 2/1991 | Germany | 285/323 |
| 1520742 | 8/1978 | United Kingdom . | |
| 1573757 | 8/1980 | United Kingdom . | |
| 2132296B | 2/1986 | United Kingdom . | |
| 2167147 | 5/1986 | United Kingdom | 285/322 |

*Primary Examiner*—Eric K. Nicholson
*Attorney, Agent, or Firm*—Baker & Daniels

[57] ABSTRACT

The disclosure relates to tube couplings having a moulded plastics coupling body with a throughway having a tapered cam surface extending to an open end. A moulded plastics collet is located in the open end of the coupling body and has an annular portion with an encircling flange at the outer end of the body and four equi-spaced slots extending into the collet from the other end to divide the collet into four resilient fingers which are pressed inwardly by the tapered cam surface to engage and grip a tube extending through the collet into the body. The slots have T-shaped ends adjacent the annular part of the collet to increase the flexibility of the fingers at their roots.

7 Claims, 2 Drawing Sheets

TUBE COUPLINGS

BACKGROUND OF THE INVENTION

1. Field of the Invention

This invention relates to tube couplings and in Particular to tube couplings of the type described and illustrated in our U.K. Patent Nos. 1520742, 1573757 and 0255368.

2. Background Prior Art

U.K. Patent Publication No. 1,520,742 discloses a tube coupling comprising a body having a throughway open at one end to receive a tube, the throughway having a tapered cam surface extending towards said one end and a collet comprising an annular sleeve located in the open end of the throughway and having resilient arms projecting axially into the throughway. The resilient arms of the collet engage the tapered cam surface with movement of the collet outwardly of the throughway to grip and lock the tube in place. The tube is released from the collet by depressing the collet into the throughway.

U.K. Patent Publication No. 1,573,757 discloses a tube coupling of the form described and illustrated in U.K. Patent Specification No. 1,520,742 in which the resilient extending arms of the collet have outer faces shaped to which bear against the tapered cam surface adjacent the sleeve portion of the collet. The inner sides of the arms have inwardly facing projections spaced towards the free ends of the arms to produce positive engagement with the tube.

U.K. Patent Publication No. 2,132,296 discloses a tube coupling of the form described and illustrated in U.K. Patent Publication Nos. 1,520,742 and 1,573,757 in which the coupling body is provided with an end cover, having a base wall formed with an aperture through which a tube can extend into the coupling body and a peripheral wall to engage around the outer periphery of the coupling body. An attachment arrangement is provided between the peripheral wall of the end cover and coupling body which enables the cover to be removed when it is required to release the tube from the coupling body but which prevents the base wall of the cover being accidentally pressed into engagement with the projecting end of the collet from the coupling body which could inadvertantly release the tube from the coupling body.

European Patent Publication No. 0,255,368 discloses a tube coupling in which the end cover has manually operable members for engaging the projecting end of the collet to depress the collet into the throughway and thereby release the tube gripped in the coupling body.

SUMMARY OF THE INVENTION

This invention provides a tube coupling comprising a coupling body having a throughway open at one end to receive a tube, a tapered internal cam surface encircling the throughway and reducing towards said open end, a collet located in the open end comprising an annular element having spaced slots extending into the annular element from one end to a location part way along the element to form resilient fingers which extend into the through way to engage between the tapered cam surface and periphery of a tube inserted through the collet into the coupling body to lock the tube in the body, wherein the slots are enlarged at their ends remote from said one end of the collet to increase the flexibility of the resilient fingers of the collet.

By way of example the slots may be T-shaped, the heads of each T being located at the end of the slots remote from said one end of the collet to provide said increased flexibility for the resilient fingers of the collet.

In a preferred form of the invention the collet may be formed as a plastics moulding and may have metal teeth embodied in the fingers of the moulding adjacent the free ends thereof, the teeth projecting on the inner sides of the fingers to engage and grip the tube to be locked in the coupling body, and the thickness of the fingers of the collet may be increased towards said one end of the collet in the region where the teeth are moulded into the collet to increase the stiffness of the fingers and thereby better support the teeth in engagement with the tube.

In one embodiment according to the invention the teeth may comprise flat arcuate strips lying in a plane extending normal to the collet axis, each strip having an inner peripheral part angled towards said one end of the collet and extending through the inner surfaces of the fingers to provide projecting edges to engage the tube to be held by the collet.

Preferably said projecting edges of the teeth are rounded to minimise damage to the tube with which they engage.

Further portions of the outer peripheries of the arcuate strips may be angled away from said one end of the collet to anchor the strips in the fingers and prevent them from being pressed through the fingers.

In any of the above arrangements the inner surface of the collet may be formed with additional tube engaging means to grip a tube inserted through the collet and thereby ensure that the collet tends to move with the tube by a force on the tube tending to push the tube into the coupling body or pull the tube from the coupling body.

For example the further tube engaging means on the collet may comprise an integral annular rib which may be continuous or segmental on the inner side of the annular portion of the collet.

In a further construction the tube engaging means may comprise an integral flexible membrane formed around the inner side of the annular part of the collet. Again, the membrane may be continuous or segmental.

In yet a further arrangement the further tube engaging means may comprise a plurality of longitudinally extending ribs formed on the inner side of the collet to engage a tube inserted therethrough.

In any of the above arrangements a cap may be mounted on the coupling body over said open end of the throughway, the cap comprising an annular wall which is detachably mounted on the coupling body and an end wall extending over the end of the coupling body with an aperture through which a tube may be inserted into said one end of the through way, the end of the coupling body being formed with an axially facing annular undercut groove to receive an end part of the annular wall of the cap and said end of the annular wall being formed with an encircling rib to snap into engagement in the undercut groove to retain the cap on the coupling body.

In the latter arrangement radially depressible cam members may be mounted at diametrically opposed locations around the peripheral wall of the cap having cam faces to engage the end of the collet projecting from the through way to depress the collet into the through way when the fingers are depressed inwardly to cause the collet to release the tube therefrom to allow the tube to be extracted from the coupling body.

DESCRIPTION OF THE PREFERRED EMBODIMENTS

Figure 1:
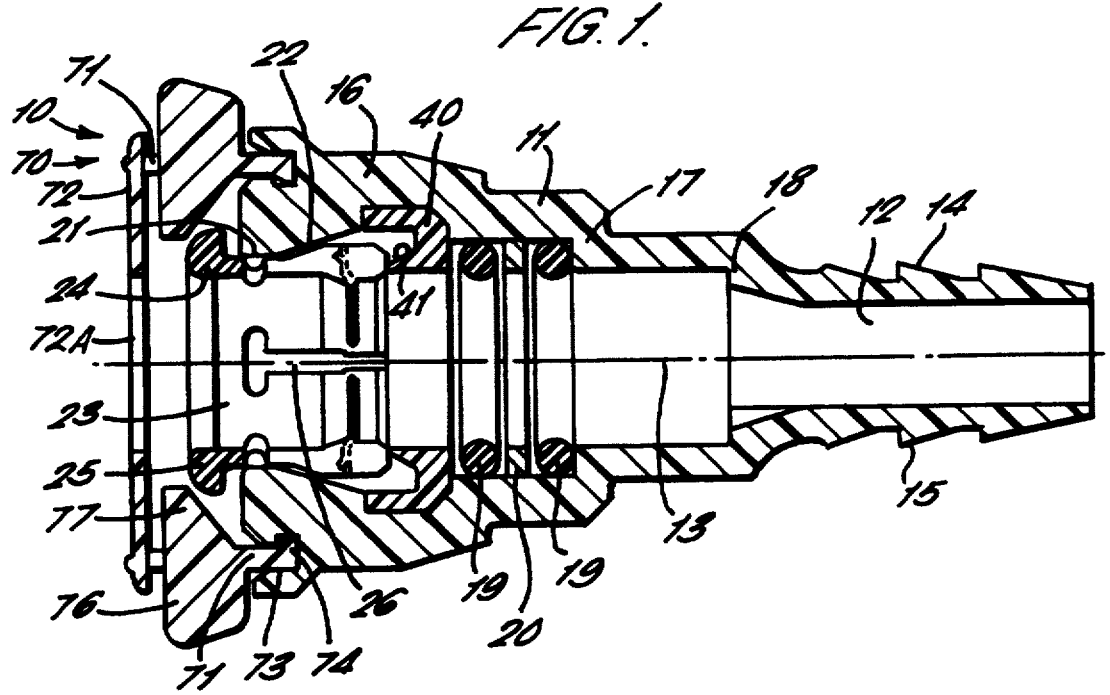
FIG. 1 is a sectional view through a tube coupling incorporating a tube gripping collet in accordance with the invention.

Referring firstly to FIG. 1 of the drawings, there is shown a tube coupling indicated generally at 10 comprising a moulded plastics coupling body 11 having a throughway 12 extending along an axis 13 through the body.

One end of the coupling body is formed as a spigot 14 having external "barb" shaped ribs 15 to engage and hold the spigot in a further component (not shown). The other end of the coupling body has an enlarged open end portion 16 and between portion 16 and spigot 14, the coupling body reduces in diameter in two spaced steps 17, 18.

A tube (not shown) to be held in the coupling body is inserted through the enlarged open end 16 until the end of the tube abuts the internal shoulder formed by the step 18 in the coupling body. A pair of "0" ring seals 19 spaced by a washer 20 are located in the section of the coupling body between steps 17 and the enlarged open end portion 16 to seal with the outer surface of the tube.

The enlarged end 16 of the coupling body is formed with an opening 21 to receive a tube to be engaged in the coupling body and adjacent the opening 21, the throughway 12 is formed with a tapered cam surface 22 reducing in diameter towards the open end 21. A moulded plastic collet 23 is located in the open end of the coupling body comprising an annular portion 24 formed with an encircling flange 25. The other end of the collet is formed with four equally spaced slots 26 extending parallel with one another part way along the length of the collet to divide that part of the collet into four resilient fingers 27. The fingers each have an angled ramp surface 27a to engage the tapered cam surface to contract the fingers around a tube into gripping engagement with the tube as described later.

Figure 2:
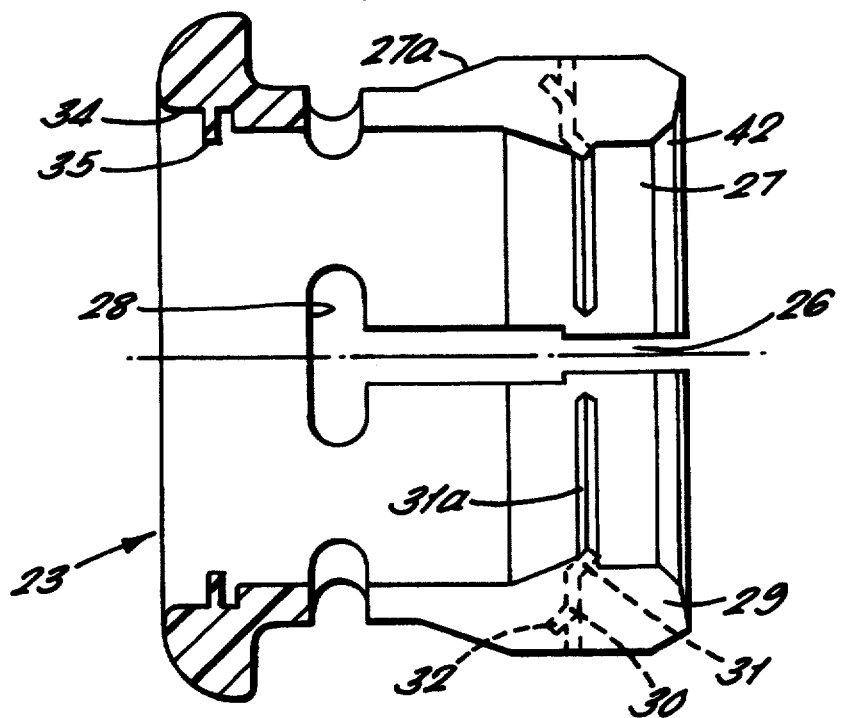
FIG. 2 is a more detailed view of the collet embodied in the coupling of FIG. 1 in which the collet incorporates an integral internal flexible membrane for engaging a tube to be held by the collet in the coupling body.

As best seen in FIG. 2 of the drawings, the slots terminate in T-shaped ends 28 to increase the flexibilty of the resilient fingers at their roots. The wall thickness of the collet is increased at the slotted ends of the collet to form relatively stiff heads at the ends of the fingers. Stainless steel strips 30 are moulded into the heads 29 lying in a common plane normal to the axis of the collet. The strips have inner peripheral portions which are angled towards the adjacent open end of the collet and project through the inner surfaces of the fingers to provide tube engaging teeth 31. The teeth have inner edges 31a to engage and grip the tube inserted through the collet. The edges 31a of the teeth 31 are slightly rounded to avoid from scratching or otherwise damaging the surface of the tubes. The strips 30 have outer peripheries having portions 32 which are angled away from the adjacent open end of the collet to assist in achoring the strips in the fingers to avoid their being pressed through the fingers when forced against the tube surface. Our U.K. Patent No. 1573757 discloses a method for making a moulded plastics collet with fingers having moulded in metal teeth which is applicable to the collet of the present invention.

The other end of the collet formed with an internal counter bore 34 and a flexible annular membrane 35 is formed integrally with the wall of the collet within the counter bore to engage and clean the surface of the tube as it is inserted through the collet. The flexible membrane 35 also has a tube gripping function as described below. Referring again to FIG. 1 of the drawings, the collet 23 is shown in situ in the open end of the coupling body and the fingers of the collet have ramp surfaces 27a to engage the tapered cam surface 22 in the coupling body so that when the collet is pulled outwardly of the coupling body, the resilient fingers are pressed radially inwardly to cause the fingers to grip the tube passing through the collet and thereby lock the tube against extraction from the coupling body.

A release ring 40 is mounted in the enlarged end of the coupling body between the section holding the seals 19 and the tapered cam surface. The release ring 40 has an integral ramp 41 which is engagable with a bevelled face 42 at the mouth of the collet so that when the collet is depressed inwardly into the coupling body, the ramp 41 engages in the mouth of the collet and expands the end of the collet to release the gripping engagement of the fingers with the tube to allow the tube to be extracted.

As indicated above, the collet is formed with an internal flexible membrane 35 at the mouth of the collet which engages the surface of the tube as it is inserted into the collet to clean the surface of the tube and also to provide a supplemental grip between the collet and tube to ensure that when the tube is pressed outwardly of the coupling body, the collet moves with the tube and causes the aforesaid contraction of the resilient fingers around the tube by the action of the tapered cam surface to lock the tube in the coupling body.

Figure 5:
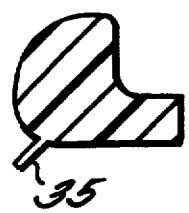
FIGS. 3 to 6 show various modified arrangements of the tube engaging flexible membrane of FIG. 2.
Figure 4:
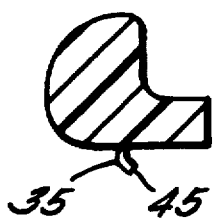
Figure 3:
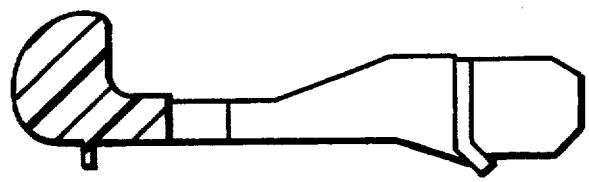
Figure 6:
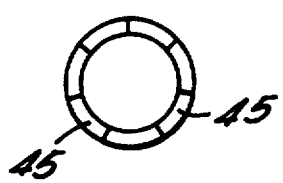

FIG. 3 of the drawings shows a modified form of the collet 23 in which the counter bore 34 is dispensed with and the flexible membrane 35 is formed directly in the main bore of the collet. FIG. 4 shows a further modification in which the inner edge portion 45 of the flexible membrane 35 is angled inwardly with respect to the collet and FIG. 5 of the drawings shows a still further arrangement in which the flexible membrane 35 is formed at the mouth of the collet angles outwardly of the collet. FIG. 6 of the drawings shows yet a further arrangement in which the membrane is formed in a number of segments to increase its flexibility.

Figure 9:
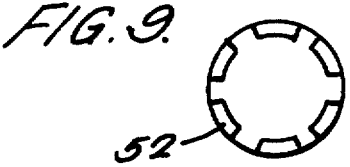
FIG. 9 shows a modification to the construction of FIGS. 7 and 8.
Figure 7:
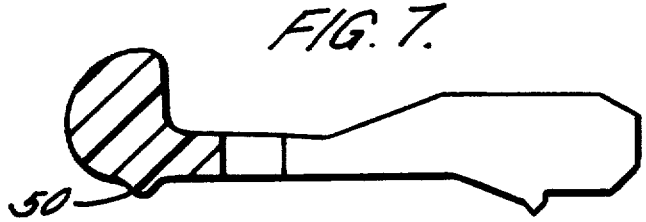
FIG. 7 is a sectional view through a collet having a tube gripping annular rib.
Figure 8:
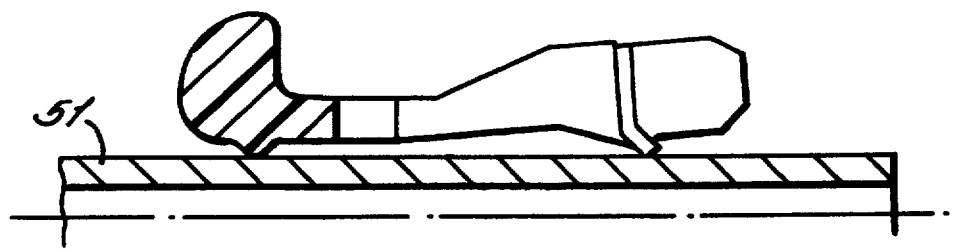
FIG. 8 shows the collet of FIG. 7 in engagement with a tube.

FIG. 7 of the drawings shows yet a further modification in which the flexible membrane 35 is replaced by an integral raised smoothly rounded rib 50 adjacent the mouth of the collet. FIG. 8 shows the arrangement of FIG. 7 in engagement with a tube 51 inserted through the collet and FIG. 9 is an end view of the collet of FIGS. 7 and 8 showing a segmented form 52 of the rib.

Figure 10:
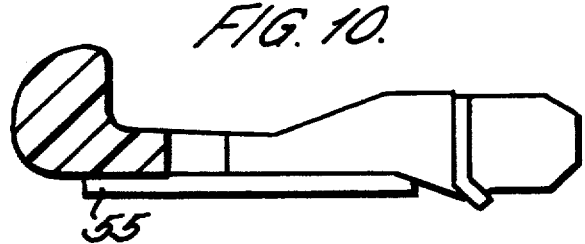
FIG. 10 is a sectional view through a collet having internal longitudinally extending tube engaging ribs.

FIG. 10 shows yet a further arrangement in which the annular membrane or rib in the collet is replaced by one or more longitudinally extending ribs 55.

Figure 11:
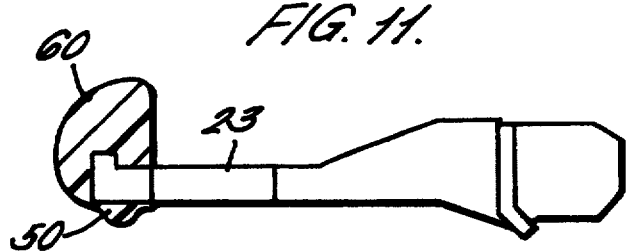
FIG. 11 shows a further collet construction.

FIG. 11 shows a modification of the arrangement of FIG. 7 in which the collet is formed with separate outturned moulded plastics flange 60 which is moulded onto the end of a metal or other basic collet construction 23, the plastics moulding also providing the internal rib 50 for engaging the tube inserted through the collet.

Reverting again to FIG. 1 of the drawings, the open end 21 of the coupling body is closed by a cap indicated at 70 and comprising a peripheral wall or skirt 71 and an end wall 72. The end wall is formed with a central aperture 72A through which a tube may extend into the coupling body. The cap is mounted on the end of the coupling body by means of an annular axially facing undercut groove 73 formed in the end face of the coupling body around the opening 21 to receive the free end of the skirt of the cap. The inner periphery of the skirt is formed with an integral internal rib 74 which snaps into the undercut channel to retain the cap on the end of the coupling body.

The skirt of the cap is formed with a pair of diametrically spaced radially extending finger members 76 formed with cam faces 77 to bear against the rounded flange 25 at the mouth of the collet so that depressing the fingers 76 inwardly causes the collet to be displaced inwardly into the coupling body to release a tube therefrom. As can be seen, the outer ends of the fingers 76 have smoothly rounded corners to allow comfortable operation.

I claim:

1. A tube coupling comprising a coupling body having a throughway open at one end to receive a tube, a tapered internal cam surface encircling the throughway and tapering towards said open end, a collet located in the open end comprising an annular element having spaced slots extending into the annular element from one end to a location part-way along the element to form resilient fingers which extend into the throughway to engage between the tapered cam surface and the periphery of a tube inserted through the collet into the coupling body to lock the tube in the coupling body, the slots being enlarged at ends thereof remote from said one end of the collet to increase the flexibility of the resilient fingers of the collet, the improvement comprising:

said collet having a monolithic annular segmental rib on an inner side of the annular element remote from said one end of the collet for engaging an outer surface of a said tube inserted through the collet, said annular rib functioning both to clean the outer surface of a said tube as it is inserted through the collet and to grip a said tube to ensure that outward movement of a said tube from the coupling body draws the collet with it and causes the resilient fingers of the collet to be forced inwardly by the tapered cam surface to grip and lock a said tube in the coupling body.

2. A tube coupling comprising a coupling body having a throughway open at one end to receive a tube, a tapered internal cam surface encircling the throughway and tapering towards said open end, a collet located in the open end comprising an annular element having spaced slots extending into the annular element from one end to a location part-way along the element to form resilient fingers which extend into the throughway to engage between the tapered cam surface and the periphery of a tube inserted through the collet into the coupling body to lock the tube in the body, the slots being enlarged at ends thereof remote from said one end of the collet to increase the flexibility of the resilient fingers of the collet, the improvement comprising:

said collet having a monolithic annular rib on an inner side of the annular element remote from said one end of the collet for engaging an outer surface of a said tube inserted through the collet, said rib comprising a segmental flexible membrane, said annular rib functioning both to clean the outer surface of a said tube as it is inserted through the collet and to grip a said tube to ensure that outward movement of a said tube from the coupling body draws the collet with it and causes the resilient fingers of the collet to be forced inwardly by the tapered cam surface to grip and lock a said tube in the coupling body.

3. A tube coupling as claimed in claim 2, wherein said collet includes a counterbore, and wherein said membrane is disposed in said counterbore.

4. A tube coupling comprising a coupling body having a throughway open at one end to receive a tube, a tapered internal cam surface encircling the throughway and tapering towards said open end, a collet located in the open end comprising an annular element having spaced slots extending into the annular element from one end to a location part-way along the element to form resilient fingers which extend into the throughway to engage between the tapered cam surface and the periphery of a tube inserted through the collet into the coupling body to lock the tube in the body, the slots being enlarged at ends thereof remote from said one end of the collet to increase the flexibility of the resilient fingers of the collet, the improvement comprising:

said collet having a monolithic annular segmental rib on an inner side of the annular element remote from said one end of the collet for engaging an outer surface of a said tube inserted through the collet, said annular rib functioning both to clean the outer surface of a said tube as it is inserted through the collet and to grip a said tube to ensure that outward movement of a said tube from the coupling body draws the collet with it and causes the resilient fingers of the collet to be forced inwardly by the tapered cam surface to grip and lock a said tube in the coupling body; and a cap mounted on the coupling body over said open end of the throughway, the cap comprising a peripheral wall which is detachably mounted on the coupling body and an end wall extending over the open end of the coupling body, said end wall having an aperture through which the tube may be inserted into said open end of the throughway, the coupling body including an annular undercut groove adjacent said open end to receive an end part of the peripheral wall of said cap, the end part of the peripheral wall having an encircling rib to snap into engagement in the undercut groove to retain the cap on the coupling body.

5. A tube coupling comprising a coupling body having a throughway open at one end to receive a tube, a tapered internal cam surface encircling the throughway and tapering towards the open end, a collet located in the open end comprising an annular element having spaced slots extending into the annular element from one end to a location part-way along the element to form resilient fingers which extend into the throughway to engage between the tapered cam surface and the periphery of a tube inserted through the collet into the coupling body to lock the tube in the coupling body, the slots being enlarged at ends thereof remote from said one end of the collet to increase the flexibility of the resilient fingers of the collet, the improvement comprising:

said collet having an inner surface with spaced longitudinally extending ribs disposed remote from said one end of the collet for engaging an outer surface of said tube inserted therethrough to grip the tube and thereby ensure that if a said tube starts a movement out of the coupling body, the collet will move with a said tube causing the resilient fingers to be forced by the tapered cam surface into a gripping and locking engagement with the outer surface of the tube.

6. A tube coupling comprising a coupling body having a throughway open at one end to receive a tube, a tapered internal cam surface encircling the throughway and tapering towards an open end, a collet located in the open end comprising an annular element having spaced slots extending into the annular element from one end to a location part-way along the element to define resilient fingers which extend into the throughway to engage between the tapered cam surface and the periphery of a tube inserted through the collet into the coupling body to lock the tube in the body, the slots being enlarged at their ends remote from said one end of the collet to increase the flexibility of the fingers of the collet, the improvement comprising:

a cap mounted on the coupling body over said open end of the throughway, the cap comprising a peripheral wall which is detachably mounted on the coupling body and an end wall extending over the open end of the coupling body, said end wall having an aperture through which a tube may be inserted into said open end of the throughway, the coupling body including an annular undercut groove adjacent said open end to receive an end part of the peripheral wall of said cap, the end part of the peripheral wall having an encircling rib to snap into engagement in the undercut groove to retain the cap on the coupling body.

7. A tube coupling as claimed in claim 6, further comprising radially depressible cam members mounted at diametrically opposed locations around the peripheral wall of the cap, said cam members having cam faces to engage an end of the collet projecting from the throughway to depress the collet into the throughway when the fingers are depressed inwardly to cause the collet to release the tube therefrom to allow the tube to be extracted from the coupling body.

* * * * *

UNITED STATES PATENT AND TRADEMARK OFFICE
CERTIFICATE OF CORRECTION

PATENT NO. : 5,370,423
DATED : December 6, 1994
INVENTOR(S) : John D. Guest

It is certified that error appears in the above-indentified patent and that said Letters Patent is hereby corrected as shown below:

Claim 1, column 5, line 45, delete "coupling", second occurrence.

Claim 4, column 6, line 38, delete "segmental".

Claim 6, column 8, line 11, delete "a" and substitute --the--.

Signed and Sealed this

Fourteenth Day of March, 1995

Attest:

BRUCE LEHMAN

Attesting Officer

Commissioner of Patents and Trademarks